United States Patent [19]

Okada et al.

[11] Patent Number: 4,833,441
[45] Date of Patent: May 23, 1989

[54] RESERVOIR WITH A REED SWITCH

[75] Inventors: Shin-ichi Okada, Ueda; Hiroyuki Sasaki, Wako, both of Japan

[73] Assignees: Nissin Kogyo Kabushiki Kaisha, Ueda; Honda Giken Kogyo Kabushiki Kaisha, Tokyo, both of Japan

[21] Appl. No.: 163,436

[22] Filed: Mar. 3, 1988

[30] Foreign Application Priority Data

Mar. 4, 1987 [JP] Japan .............................. 62-31464[U]

[51] Int. Cl.$^4$ ............................................. G08B 21/00
[52] U.S. Cl. ................................. 340/450; 340/624; 73/307; 200/84 C
[58] Field of Search ......................... 340/59, 624, 623; 200/84 R, 84 C; 73/307, 308, 319

[56] References Cited

U.S. PATENT DOCUMENTS

| | | |
|---|---|---|
| 1,465,351 | 8/1923 | Dixon ..................................... 340/59 |
| 3,397,870 | 8/1968 | McCann et al. ...................... 200/84 |
| 3,751,614 | 8/1973 | Jones . | 
| 3,781,858 | 12/1973 | Lewis . |
| 4,094,437 | 6/1978 | Hayashida ......................... 340/59 X |
| 4,107,493 | 8/1978 | Nagara et al. ................... 340/624 X |

FOREIGN PATENT DOCUMENTS

| | | |
|---|---|---|
| 57-33400 | 7/1982 | Japan . |
| 59-11780 | 4/1984 | Japan . |
| 60-128934 | 8/1985 | Japan . |
| 60-36753 | 10/1985 | Japan . |
| 1020407 | 2/1966 | United Kingdom . |

*Primary Examiner*—Joseph A. Orsino
*Assistant Examiner*—Brian R. Tumm
*Attorney, Agent, or Firm*—Armstrong, Nikaido, Marmelstein, Kubovcik & Murray

[57] ABSTRACT

A reservoir, for retaining liquid such as coolant of a radiator of an automobile comprises a container having an opening and a deep portion. A switch case extends in the container, which has a flange at an end portion and a float cover at the other end portion. The flange is mounted on the periphery of the opening so as to suspend the switch case in the container. A reed switch is contained in the switch case. A float having a device for turning one and off the reed switch is slidably contained in the float cover. A tube extends into the container through the flange, through which tube the liquid is supplied into, and removed from the container. A holder is fixed on the float cover, which holds the tube in a fixed position. The flange of the switch case is positioned such that the tip portion of the tube is located at the deepest portion of the container.

5 Claims, 3 Drawing Sheets

4,833,441

RESERVOIR WITH A REED SWITCH

BACKGROUND OF THE INVENTION

I. Field of the Invention

This invention relates to a reservoir. More particularly, this invention relates to a reservoir with a reed switch for warning that the level of liquid contained in the reservoir is below a prescribed level. The reservoir is used for example, in a radiator system of an automobile for retaining coolant of the radiator.

II. Description of the Prior Art

In conventional reservoirs for radiators of, for example, automobiles, such as disclosed in Japanese Utility Model Publication (Kokoku) Nos. 11780/84 and 36753/85, a tube through which the liquid is supplied to, and removed from the reservoir is suspended from an opening of the reservoir. However, a reservoir used in a radiator of, for example, an automobile often has an irregular shape with a deep portion because the space for mounting the reservoir is often limited. In cases where the reservoir has an irregular shape with a deep portion, if the tube is merely suspended from the opening of the reservoir as in the prior art, the tip of the tube may not be located at the deepest portion of the reservoir. If the tip portion of the tube is not located in the deepest portion, the liquid in the deepest portion cannot be removed therefrom through the tube, so that the liquid in the deepest portion cannot be used. Thus, a part of the inner volume of the reservoir cannot be used effectively.

SUMMARY OF THE INVENTION

Accordingly, the object of the present invention is to provide a reservoir having an irregular shape with a deep portion, in which the tip portion of the tube through which liquid is supplied to and removed from the reservoir can easily be positioned at the deepest portion of the reservoir.

The reservoir of the present invention comprises a container having an opening and a deep portion. A switch case extends in the container, which has a flange at an end portion and a float cover at the other end portion. The flange is mounted on the periphery of the opening so as to suspend the switch case in the container. A reed switch is contained in the switch case. A float having a device for turning on and off the reed switch is slidably contained in the float cover. A tube extends into the container through the flange, through which tube the liquid is supplied to, and removed from the container. A holder is fixed on the outer surface of the switch cover, which holds the tube in a fixed position. The flange of the switch case is positioned such that the tip portion of the tube is located at the deepest portion of the container.

According to the reservoir of the present invention, the tip portion of the tube can easily be positioned so as to be located at the deepest portion of the container. Therefore, the full inner volume of the container can be used effectively. Further, since the tube is held by a holder fixed on the outer surface of the float cover, the sliding movement of the float is not hindered by the tube.

DETAILED DESCRIPTION OF THE PREFERRED EMBODIMENTS

A preferred embodiment of the reservoir of the present invention will now be described referring to the appended drawings.

Figure 1:
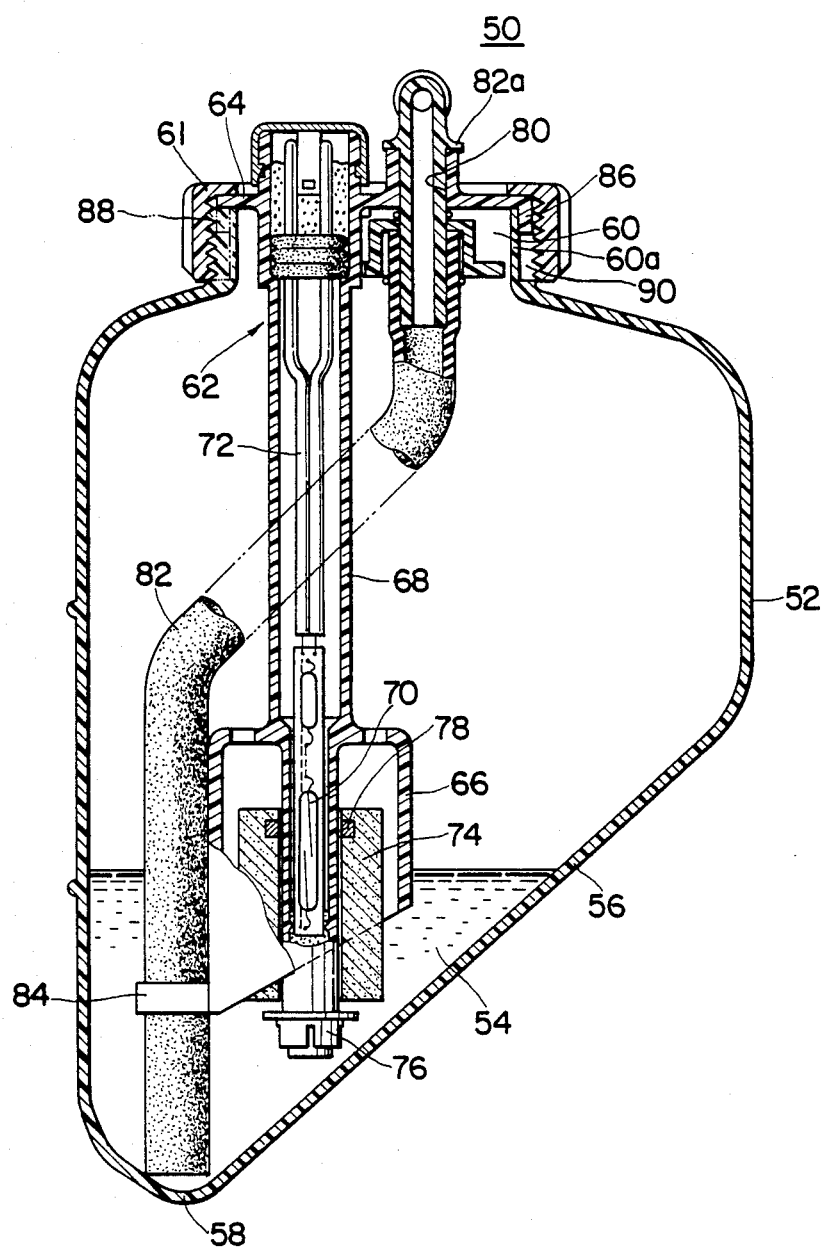
FIG. 1 is a cross-sectional front view of an embodiment of a reservoir of the present invention, which is employed in a radiator system.

The reservoir 50 of the present invention has a container 52 in which liquid 54 such as coolant of a radiator is retained. The bottom 56 of the container 52 is slanted as shown in FIG. 1 to provide a deepest portion 58.

An opening 60 is provided in the upper portion of the container 52. A switch case 62 extends in the container 52. The switch case 62 has a flange 64 at an end portion thereof and a float cover 66 with an enlarged diameter at the other end portion thereof. The flange 64 and the float cover 66 are connected via a switch-retaining duct 68 which also extends in the inner side of the float cover 66. The flange 64 is mounted on the periphery 60a of the opening 60 ad a cap 61 is screwed to the periphery of the opening 60 to clamp the flange 64 between the cap 61 and the periphery 60a of the opening 60. The tip of the switch-retaining duct 68 is liquid-tightly sealed so as to prevent the liquid from entering the duct 68. A reed switch 70 is provided in the portion of the switch-retaining duct 68, which portion is located in the float cover 66. The read swich 70 is connected to an alarm (not shown) via a lead line 72. A cylindrical float 74 enclosing the switch-retaining duct 68 is slidably contained in the float cover 66. A float stopper 76 with an enlarged diameter is provided at the tip portion of the switch-retaining duct 68 to prevent the float 74 from falling out of the duct 68 even if no liquid is contained in the container 52. An annular magnet 78 is embedded in the upper portion of the float 74, which turns on and off the reed switch 70. More particularly, if the level of the liquid 54 is higher than the upper portion of the float case, the float 74 is in the uppermost position so that the reed switch 70 is opened because the distance between the magnet 78 and the reed switch 70 is large. As the level of the liquid 54 is lowered, the float 74 is lowered accordingly. If the level of the liquid 54 is lowered to reach a prescribed level, the reed switch 74 is closed by the magnetic force of the magnet 78.

A through hole 80 is formed in the flange 64. A tube 82 in which the liquid 54 is supplied to, and removed from the container 52 extends in the container through the through hole 80. The tube 82 is connected to, for example, a coolant inlet of a radiator (not shown). The tube 82 has a flange 82a and the flange 82a is mounted on the periphery of the through hole 80 so as to suspend the tube 82 in the container 52. Although not restricted, the tube 82 may be made of a flexible material such as rubber. A holder 84 is fixed on the outer surface of the float cover 66. The holder 84 holds the tube 82 in a fixed position.

Figure 2:
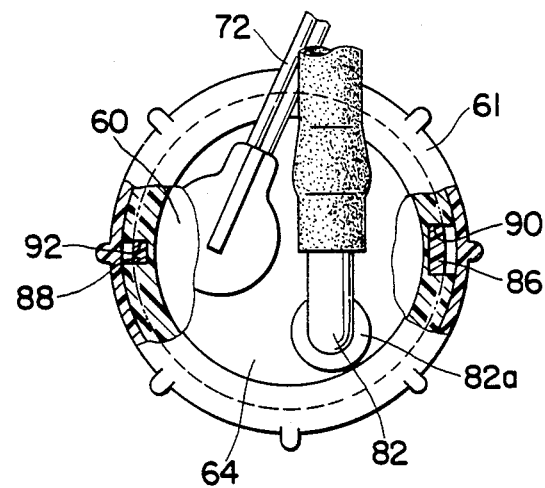
FIG. 2 is a partly cut-away plan view of a switch case provided on the reservoir shown in FIG. 1.

As shown in FIG. 2, positioning projections 86 and 88 with different width are provided on the peripheral portion of the flange 64, and corresponding positioning notches 90 and 92 are formed in the periphery 60a of the opening 60. By fitting the positioning projections 86 and 88 in the positioning notches 90 and 92, respectively, the flange 64 and, in turn, the switch case 62 and the tube 82 are positioned. The positioning projections 86 and 88 and the positioning notches 90 and 92 are formed in the positions such that tip of the tube 82 is located in the deepest portion 58 of the container 52 upon fitting the positioning projections 86 and 88 in the corresponding positioning notches 90 and 92.

By the above-described structure, it is assured that the tip of the tube 82 is automatically located in the deepest portion of the container 52 by merely positioning the flange 64 using the positioning projections 86 and 88 and positioning notches 90 and 92. Thus, in assembling the reservoir, the positioning of the tip of the tube 82 at the deepest portion 58 may easily be attained. Further, since the tube 82 is held by a holder 84 fixed on the outer surface of the float cover 66 encircling the float 74, the sliding movement of the float 74 is not hindered by the tube 82.

Figure 3:
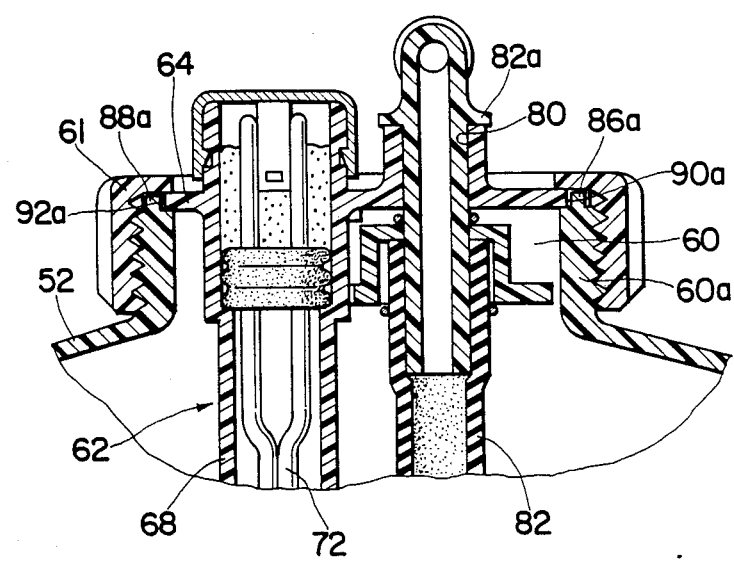
FIG. 3 is a partly cut-away front view of another embodiment of a reservoir of the invention.

Although the invention was described based on a specific preferred embodiment of the present invention, it is apparent that various modifications may be made by those skilled in the art without departing from the scope and spirit of the present invention. For example, as shown in FIG. 3, the positioning projections 86a, 88a may be provided on the periphery 60a of the opening 66 and the corresponding positioning notches 90a, 92a may be formed in the peripheral portion of the flange 64 of the switch case 62. Further, only one positioning projection and only one corresponding positioning notch are enough for positioning the flange of the switch case. Thus, the scope of the invention should be determined based on the appended claims.

We claim:

1. A reservoir comprising:
    a container for retaining liquid therein, which has an opening and a deepest portion;
    a switch case extending in the container, which includes a flange at an end portion and a float cover at the other end portion, the flange being mounted on the periphery of the opening so as to suspend the switch case in the container;
    a reed switch contained in the switch case;
    a float slidably contained in the float cover, which has means for turning on and off the reed switch;
    a tube extending into the container through the flange, through which tube the liquid is supplied into, and removed from the container;
    a holder fixed on the outer surface of the float cover, which holds the tube in a fixed position; and
    means for positioning the flange to locate a tip portion of the tube at the deepest portion of the container.

2. The reservoir of claim 1, wherein the means for positioning the flange includes a projection formed on a peripheral portion of the flange and a corresponding notch formed in the periphery of the opening.

3. The reservoir of claim 1, wherein the means for positioning the flange includes a notch formed in a peripheral portion of the flange and a corresponding projection formed on the periphery of the opening.

4. The reservoir of claim 1, wherein the means for turning on and off the reed switch is a magnet embedded in the float.

5. The reservoir of claim 1, which is a reservoir for a radiator system of an automobile.

* * * * *